United States Patent [19]

Lewis et al.

[11] 4,456,548

[45] Jun. 26, 1984

[54] COMPOSITION AND METHOD FOR MAKING CONDUCTIVE POLYMERS

[75] Inventors: David Lewis; Davida W. Kalina, both of Naperville; Tsung-Ein Tsai, Warrenville, all of Ill.

[73] Assignee: Standard Oil Company (Indiana), Chicago, Ill.

[21] Appl. No.: 434,599

[22] Filed: Oct. 15, 1982

Related U.S. Application Data

[63] Continuation-in-part of Ser. No. 309,829, Oct. 8, 1981, abandoned.

[51] Int. Cl.³ .............................................. C08K 3/16
[52] U.S. Cl. .................................. 252/500; 252/518; 252/519; 252/520
[58] Field of Search ............... 252/500, 511, 518, 519, 252/520; 524/404, 418, 438; 525/336, 344, 356, 357

[56] References Cited

U.S. PATENT DOCUMENTS

| 2,801,982 | 8/1957 | Fuchs | 524/438 |
| 3,177,169 | 4/1965 | Crooks | 524/404 |
| 3,253,880 | 5/1966 | Lawson | 525/344 |
| 3,488,316 | 1/1970 | Flavell | 525/336 |
| 4,020,223 | 4/1977 | Dixon | 525/356 |

*Primary Examiner*—Paul R. Michl
*Attorney, Agent, or Firm*—Richard A. Kretchmer; William T. McClain; William H. Magidson

[57] ABSTRACT

Disclosed is a composition comprising a doped solid resinous acrylonitrile polymer wherein said acrylonitrile polymer is selected from the group consisting of at least one condensed polyacrylonitrile and dehydrohalogenated polyalphahaloacrylonitrile and said polymer is doped with at least one reagent capable of forming charge-transfer complexes with said acrylonitrile polymer selected from the group consisting of Lewis acids and Lewis bases. Also disclosed are films of said polymer and a process for making said composition.

13 Claims, No Drawings

COMPOSITION AND METHOD FOR MAKING CONDUCTIVE POLYMERS

CROSS-REFERENCE TO RELATED APPLICATIONS

This application is a continuation-in-part of application Ser. No. 309,829, filed Oct. 8, 1981, abandoned.

BACKGROUND

Throughout the last five years there has been a considerable interest growing among chemists, physicists, and electrical engineers in the development of electrically-conductive organic polymers for use in a variety of applications. Potential applications include lightweight electrical conductors, microwave shields, antistatic devices, photocopying processes, and photovoltaic devices. There are several advantages in using organic polymers versus classical inorganic materials for these applications: orgaic polymers are by nature lightweight and easily processable, and they offer lower materials costs. For purposes hereof, the term "electrically-conductive organic polymers" refers to polymers whose conductive properties are derived from the conduction band structure of the polymer itself, rather than through the addition or impregnation of a conductor into a polymer substrate. Accordingly, conductive polymeric systems composed of a conductive material (such as powdered graphite or copper fibers) imbedded in an insulating organic polymer matrix or substrate is not considered a conducting polymer within the meaning of the present invention.

To the best of our knowledge, the first example of a highly conductive organic polymer film was demonstrated by researchers at the University of Pennsylvania and reported by Shirakawa et al., *Chem. Commun.*, 1977, p. 578. Their results with chemically doped polyacetylene films greatly stimulated research in this field.

The electrical conductivities of most organic polymers in their virgin state tend to be low; typical values range from $10^{-5}$ to $10^{-14}(\Omega\text{-cm})^{-1}$. If compared to the conductivities of classical inorganic materials, such as copper ($10^6$ $(\Omega\text{-cm})^{-1}$), silicon ($10^{-5}$ $(\Omega\text{-cm})^{-1}$), or quartz ($10^{-18}(\Omega\text{-cm})^{-1}$), most organic polymers would be termed insulators or poor semiconductors. In fact, organic polymers are widely used as electrically-insulating materials in the electronics industry.

A consideration of the band theory as developed for classical inorganic materials is often helpful in describing in very simple terms the insulating nature of a multitude of organic polymers, such as polytetrafluoroethylene (Teflon), polyethylene, polystyrene, and like materials. The low conductivities exhibited by most polymers can be envisioned as resulting from the presence of filled valence electron bands with large energy separations between the valence or highest occupied molecular orbital (HOMO) and conduction or lowest unoccupied molecular orbital (LUMO) bands in these materials. The HOMO-LUMO energy gaps in polyethylene and similar polymers are generally greater than about 3 eV. Classical inorganic materials with valence-conduction band gaps of this magnitude exhibit electrically insulating behavior.

However, presently there are a number of different highly conductive (conductivities around $10^\circ$ $(\Omega\text{-cm})^{-1}$) organic polymers that have been well documented in the open literature. The earliest recognized and most extensively studied of these is polyacetylene, $(CH)_x$, doped with electron-accepting or donating reagents. Work has been done in this area by Shirakawa et al.; Chiang et al., *Phys. Rev. Lett.*, 1977, 39, 1098; Park et al., *J. Chem. Phys.*, 1980, 73, 946; and Chiang et al., *Ber. Bunsenges. Phys. Chem.*, 1979, 83, 407. Shacklett et al., *Synthetic Metals*, 1979, 1, 307 has worked with doped poly-p-phenylene and others have investigated poly-p-phenylenesulfide, poly-p-phenylenevinylene, polypyrrole and poly-thienylene. A common feature of all these polymers is a molecular structure possessing some degree of $\pi$-electron conjugation along the polymer chain. For poly-p-phenylenesulfide, it is postulated that empty sulfur d-orbitals participate in $\pi$-conjugation with the phenylene $\pi$-system. Although the exact mechanism of charge transport in these doped polymers is still under great debate, it is generally recognized that some degree of $\pi$-conjugation in the polymers is a prerequisite to high conductivity.

The polymers mentioned above all exhibit low electrical conductivities (e.g., $10^{-9}$ $(\Omega\text{-cm})^{-1}$ for cis-polyacetylene) before they are chemically treated or "doped" with appropriate electron-accepting or donating reagents. For purposes hereof, the term "doped" in this art refers to the formation of charge transfer complexes between suitable organic polymers and appropriate electron-accepting or electron-donating reagents. This usage of the term is to be distinguished from the usage associated with the semiconductor art which pertains to the positional substitutions of certain atoms for other atoms, as in "doped" inorganic semiconductors. Reaction of suitable organic polymers with electron-accepting reagents results in transfer of electron density from the $\pi$-orbitals of the polymers to the acceptor. Similarly, reaction with an electron donor causes addition of electron density to the $\pi$-system of the polymers from the donor. For purposes hereof, a "doped polymer" is therefore a polymer which has undergone changes in its $\pi$-system electron density through the formation of charge-transfer complexes by reaction of the polymer with suitable electron-acceptor or electron-donor reagents. Such partial oxidation or reduction of polymers upon doping with appropriate reagents is believed to be responsible for the greatly enhanced electrical conductivities displayed by these polymer systems.

Shirakawa et al. and Park et al. have disclosed that a variety of Lewis acids and bases are effective dopants for enhancing the conductivity of polyacetylene. Oxidants such as iodine, bromine, and $AsF_5$ have been employed, and they indicate that the dopants remain in the polymer matrix after charge transfer as, for example, $I_n^-$ or $AsF_6^-$ anions. It is also known in the art that polyacetylene can also be reduced with Lewis base alkali metal alloys or sodium naphthalide in tetrahydrofuran; charge transfer results in the inclusion of cations (i.e., alkali metal cations) in the polymer matrix.

There has not been total agreement upon a description of the ways in which the polymer-dopant charge transfer complex manifests itself and influences the charge transport mechanisms in these conjugated polymer systems. For heavily-doped polyacetylene films with conductivity of about $10^{2-3}$ $(\Omega\text{-cm})^{-1}$, a band theory model seems adequate. In this model, the population of charge carriers in the valence and conduction bands of $(CH)_x$ has been altered sufficiently that individual strands of polyacetylene within a polymer film are described as metallic; however, the "metallic" strands are separated by thin regions of interstrand contact characterized by a potential barrier to charge transport. Along the strands, conduction is metallic; between strands, conduction occurs via a thermally-activated process.

For lightly-doped semiconducting $(CH)_x$ films with conductivities of about $10^{-6}$ $(\Omega\text{-cm})^{-1}$, band theory is inadequate in explaining all the charge transport phenomena. Instead, a mechanism involving the formation of charged solitons—or rather localized charged domain walls, akin to organic radicals—has been proposed. In this mechanism, charge transport would occur via thermally-activated hopping along the polymer chain of the domain walls.

Of these conjugated polymer systems, only poly-p-phenylenesulfide (PPS) exhibits favorable fabrication properties as well as favorable thermal and atmospheric stability; PPS can be heat molded. However, PPS doped with $AsF_5$ is much less stable to the atmosphere and more brittle than virgin PPS. To date, only $AsF_5$ has been reported as a suitable dopant for PPS. With certain of these polymer systems (PPS, poly-p-phenylene, poly-p-phenylenevinylene) it appears that $I_2$ and $Br_2$ are not strong enough oxidants to effect conductivity enhancements. Fabrication difficulties also exist with polypyrrole. Films of this polymer can only be obtained in situ as the monomer is polymerized. Once polymerized, polypyrrole cannot be further processed by solution or melt methods. Polythienylene is quite stable in air and can be doped with $I_2$, but it exists as an intractable powder.

Although doped polyacetylene exhibits the highest conductivity as well as the broadest range of accessible conductivities (as a function of dopant concentration) of an organic polymer currently known, polyacetylene does not exhibit environmental stability or desirable fabricating properties. More specifically, the major limitations in the practical applications of polyacetylene as an organic conductor are the extreme insolubility of $(CH)_x$ in solvents other than concentrated $H_2SO_4$, and the chemical instability of $(CH)_x$ and its conductive derivatives in the ambient atmosphere and at elevated temperatures. Fabricating films or coatings of $(CH)_x$, after the acetylene has been polymerized, is nearly impossible due to the insolubility of $(CH)_x$ and its inability to be molded by heat-pressing techniques. Consequently, fabrication of $(CH)_x$ would be necessary in situ, as the acetylene is polymerized. Polyacetylene is also unstable with respect to air oxidation before doping and becomes even more unstable after doping. The chemical degradation of the conductive $(CH)_x$ in air or at elevated temperatures is accompanied by a decrease in the electrical conductivity of these materials. Hence, long-term stability of the electrical properties in these systems is difficult to achieve.

Carr et al. in U.S. Pat. No. 4,160,760 disclose a method for interacting Prussian blue with polyacrylonitrile to produce a polymer with enhanced color fastness and electrical properties. While the primary focus of the Carr et al. reference appears to be obtaining a polymer which exhibits a homogeneous color, Carr et al. note that "enhanced . . . conductivity" may also occur. No reason for this speculation and no conductivity measurements or tests were reported, however. It should also be noted that Carr et al. deals exclusively with uncondensed polyacrylonitrile.

For potential applications of conductive organic polymers, it is desirable to develop polymeric systems exhibiting favorable fabrication, solubility, environmental and stability characteristics in addition to electronic structures conducive to the formation of conductive charge transfer complexes with electron acceptors.

It is an object of the present invention to develop a polymer system which exhibits conductivity in the range of semiconductors (from about $10^{-10}$ to about $10^2$ $(\Omega\text{-cm})^{-1}$). It is a further object of this invention to develop a conductive polymer possessing semiconductor properties as well as favorable environmental properties. It is another object of this invention to develop a conductive polymer having favorable environmental properties which can be readily fabricated and processed. It is another object of this invention to develop a conductive polymer system possessing favorable stability and solubility characteristics. It is a further object of this invention to develop a method for fabricating such a polymer system.

SUMMARY OF THE INVENTION

In general, the objects of this invention are achieved by a composition comprising a doped solid resinous acrylonitrile polymer wherein said polymer is selected from the group consisting of at least one condensed polyacrylonitrile and dehydrohalogenated polyalphahaloacrylonitrile and said polymer is doped with at least one reagent capable of forming charge transfer complexes with said acrylonitrile polymer selected from the group consisting of electron donors and electron acceptors.

The composition of this invention exhibits conductivities in the range of semiconductors and advantageous environmental qualities. Thin films can be readily fabricated and processed with compositions of the present invention which remain quite stable and can be easily handled.

For purposes hereof, it is to be understood that condensation of a polymer in accord with the present invention can be effected in two ways. First, in the simplest case, the condensation process comprises condensing or conjugating a plurality of pendant cyano-groups in a polyacrylonitrile polymer to form a conjugated carbon-nitrogen "ladder" polymer which possesses linear, substantially uncrosslinked chains of fused aliphatic rings. A simple example of such a condensation of polyacrylonitrile has been represented by Mark, "Polymeric Conductors and Semiconductors," *Israel Journal of Chemistry*, 10, 1972, 407, 413, as

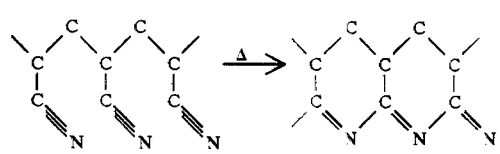

wherein Δ represents the condensation or conjugation process. Second, in cases wherein the starting material is a polyalphahaloacrylonitrile, the term "condensation" is understood to include dehydrohalogenation of polyalphahaloacrylonitrile, which can be schematically

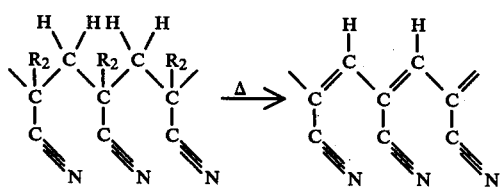

wherein R$_2$ is the halo substituent.

In a first aspect, the present invention comprises a resinous polymer of an acrylonitrile comprising a plurality of condensed pendant cyano-groups forming a conjugated carbon-nitrogen chain, and a plurality of charge-transfer complexes formed between said polymer and a suitable doping reagent capable of either donating or accepting an electron.

In another aspect, the present invention comprises a solid resinous polymer of a dehydrohalogenated polyalphahaloacrylonitrile comprising a carbon-carbon conjugated backbone and a plurality of charge-transfer complexes formed between said polymer and a suitable doping reagent capable of either donating or accepting an electron.

In the simplest embodiment of the present invention, the starting material prior to condensation and doping is unsubstituted polyacrylonitrile (PAN) which can be represented as

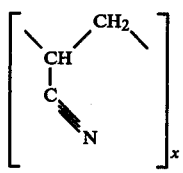

In another embodiment, substituted derivatives of PAN, such as polyalphahaloacrylonitrile (preferably chloro or bromo) and polymethacrylonitrile, can be condensed and doped within the meaning of the present invention to yield materials which display increased electrical conductivities relative to those of the uncondensed and undoped polymers.

From these starting materials, polymers possessing enhanced electrical properties can be made by the process comprising doping a condensed solid resinous acrylonitrile polymer with a dopant capable of forming charge-transfer complexes with said condensed polymer at a temperature above about ambient but below the decomposition temperature of said polymer (for example, about 300° C.).

The essential step in the process of this invention involves contacting the condensed polymer with at least one electron donor or electron acceptor doping reagent capable of forming charge transfer complexes with the polymer. As the formation of charge-transfer complexes with electron acceptors and donors effectively oxidizes or reduces the polymer, suitable reagents in accord with the present invention include conventional oxidants and reductants, such as Lewis acids and Lewis bases, respectively. Among these, Lewis acids such as iodine, bromine and AsF$_5$, and Lewis bases, such as alkali metal alloys and sodium naphthalide in tetrahydrofuran are preferred. For oxidants, it is believed that the dopants remain in the polymer matrix after charge transfer as, for example, I$_n^-$ or AsF$_6^-$ anions. For reductants, charge-transfer results in the inclusion of cations, for example, alkali metal cations, in the polymer matrix.

While it has been suggested that condensation of an acrylonitrile polymer alone may result in an increase in conductivity, we have found that such enhancement is very slight. In addition, Carr et al. has separately noted that halogen treatment of uncondensed polyacrylonitrile may enhance the electrical properties of the polymer. There is no appreciation in Carr et al., however, that halogen treatment of condensed polyacrylonitrile polymers results in compositions of this invention. A key feature of the present invention is the surprising and novel discovery that the combination of condensation and doping results in dramatic increases in the conductivity of acrylonitrile polymers of this invention substantially greater than that which can be attributed to the combined individual effects of condensation and doping.

Generally, the condensation of the polymer backbone is induced thermally and, in most cases, is accompanied by an intense coloration of the polymer films. The heat-treated films are then contacted with a suitable dopant, preferably halogen vapors at ambient or elevated temperatures, for varying lengths of time. The electrical properties of the films are a function of the doping parameters (temperature and length of exposure) and can be optimized by routine experimentation.

DETAILED DESCRIPTION

There are two essential aspects of the chemical modification process to attain increased conductivities in both substituted and unsubstituted acrylonitrile polymers. The first is condensation, or the formation of a conjugated carbon-carbon or carbon-nitrogen backbone in at least a portion of the polymer; the second is the treatment of the conjugated system with electron acceptors, (preferably iodine or bromine) or electron donors (preferably sodium naphthalide) to form an electrically conductive material.

For simplicity and clarity, the ensuing general discussion will refer to unsubstituted polyacrylonitrile (PAN), although it should be understood that, except where noted, the general features discussed below apply equally well to polymers formed from substituted derivatives of acrylonitrile.

The PAN starting material can be either obtained commercially in powder form from any one of a variety of commercial suppliers of PAN, or the polymer can be made simply by bulk polymerizing the acrylonitrile monomer using an initiator such as 2,2'-azo bis (isobutyronitrile). The powder is then purified by washing with hexane or toluene.

It should be understood that the steps of fabrication (e.g., processing into a film) condensation and doping can be performed in any order. Care need only be taken to ensure that fabrication or processing after doping and condensation does not result in degradation of the condensed chains of the polymer. Moreover, condensation and doping can, for example, be accomplished simultaneously with the fabrication step. For simplicity, however, the discussion herein will address doping and condensation after a film has been made.

To form a film, a viscous solution of the polymer is prepared in a polar solvent such as dimethylformamide (DMF). Films of the acrylonitrile polymers are then solvent-cast onto glass slides and the solvent is allowed to evaporate. To effect condensation, the clear, colorless PAN films are heated to about 200° C., yielding translucent deep reddish-brown films of condensed polyacrylonitrile (ΔPAN). Very flexible films are obtained in this manner. Alternatively, powdered PAN is heated at about 200° C. under pressure; translucent, reddish-brown ΔPAN films are obtained with greater thicknesses than those prepared via solution casting. Condensation can be performed under a variety of atmospheres: air, nitrogen, and vacuum have proven to be suitable.

As noted previously, suitable dopants in accord with the present invention can be either electron acceptors or electron donors capable of forming charge-transfer complexes with the polymers. If electron acceptors are used, it is believed that electron density is removed from the outer π-orbitals of the polymer constituents and transferred to the outer orbitals of the acceptors. It should be noted that such charge-transfer phenomena involve a migration of electron density which is both critical to effect conductivity enhancement and distinct from covalent bond formation.

Suitable electron-acceptor dopants comprise conventional oxidants, such as Lewis acids. Suitable Lewis acids for use in accord with the present invention include bromine, iodine, chlorine, IBr, ICl, AsF$_5$, HBr, BF$_3$, BCl$_3$, SO$_2$, SO$_3$, and transition metal complexes. Lewis acids such as bromine or iodine are generally preferred due to the fact that they are normally in a liquid or gaseous state and are thereby easier to handle. Suitable electron-donor dopants comprise conventional reductants such as Lewis bases, including Na, K, Ba, Li, Ca, Mg and Al.

It appears, however, that both electron-acceptor and electron-donor dopants are capable of achieving roughly the same degree of conductivity enhancement. Accordingly, the choice of dopant in any particular application may be dictated by availability or ease of handling as opposed to any intrinsic advantage. It should also be noted that electron-donor dopants may be expected to cause smaller band gaps than electron-acceptor dopants.

The doping process itself is preferably done in gas phase. Two tungsten electrodes for resistance measurements are first attached to the sample film with either graphite or silver paint. The sample is placed in a vacuum chamber and evacuated to about 10$^{-6}$ torr. A valve is then opened to allow the free expansion of the dopant vapor into the region of the sample. Resistance measurements are then taken as the doping takes place until the dopant vapor has reached equilibrium; at this point no further uptake of dopant by the sample is expected and the maximum increase in conductivity is attained.

Specific preferred operating conditions under which the doping is carried out can be affected by the character and dimensions of the film. If only surface conductivity is desired, the dopant need only be absorbed at the surface of the film. Current paths that are through the film (i.e., front face to back face) are expected to require more extensive doping to facilitate distribution of the dopant into the interior of the film.

Substituted derivatives of an acrylonitrile polymer are also contemplated as precursors of the conductive polymers of the present invention. In general, polymers of uncondensed derivatives of an acrylonitrile polymer will have recurring acrylonitrile units with the structure

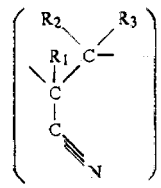

wherein $R_1$, $R_2$ and $R_3$ are independently selected from the group consisting of hydrogen, alkyl of from 1 to 6 carbon atoms, aryl, alkoxy, cyano, amino and halo. Thus, polyalphahaloacrylonitriles are examples of substituted derivatives of acrylonitrile polymers useful in this invention. Examples of such substituted derivatives include polyalphachloroacrylonitrile (PACN) wherein $R_1$=Cl and $R_2$=H, and polymethacylonitrile wherein $R_1$=CH$_3$ and $R_2$=H. In accord with the present invention, formation of the condensed form of a polyalphahaloacrylonitrile, such as polyalphachloroacrylonitrile (ΔPACN), by dehydrohalogenation yields a carbon-carbon conjugated polymer with recurring units of

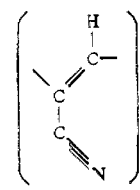

whereas polymerization of the nitrile substituents of polymethacrylonitrile (PMAN) results in carbon-nitrogen conjugated polymer, i.e. condensed polymethacrylonitrile (ΔPMAN), with recurring units having the structure

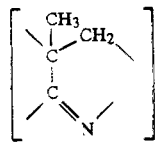

The formation of the condensed or conjugated systems (ΔPACN and ΔPMAN) from the unmodified polymers by thermal degradation has been described by Grassie et al., J. Polym. Sci., Part C, 1967, 591–599, and Nakamura et al., J. Appl. Polym. Sci., 1972, 16, 1817–1825, and is expressly incorporated herein by reference.

Analogous to unsubstituted polymers of acrylonitrile, condensation of polyalphahaloacrylonitriles is generally induced thermally and is accompanied by an intense coloration of the polymer. Heating colorless films of polyalphachloroacrylonitrile at about 100° C. to promote dehydrochlorination results in dark shiny-purple ΔPACN films. Deep red-orange films of ΔPMAN result from the condensation of the nitrile groups in PMAN at about 190° C.

As is known in the art, the rate at which thermal degradation of PMAN occurs is dependent upon the polymerization initiator used and, thus, upon the functional group impurities introduced into the polymer by the initiators. For comparison purposes, two methods found in the literature were employed for polymerizing methacrylonitrile. The first entailed the polymerization of bulk methacrylonitrile utilizing a free radical catalyst such as azobisisobutyronitrile (AIBN) under inert atmosphere. The polymerization was carried out at ambient rather than elevated temperature to avoid premature thermal degradation, which would decrease the solubility of the polymer in solvents such as dimethylformamide (DMF). Unreacted monomer was removed via vacuum distillation. The polymer was obtained as a waxy, colorless solid.

In the second approach, methacrylonitrile was polymerized at $-78°$ C. in toluene solution with n-butyllithium (BuLi) as the initiator. The polymer was filtered from the solution as a finely divided, light yellow powder.

More detailed features of the present invention may be discerned by reference to the following specific examples.

EXAMPLE I

A thin film of polyacrylonitrile (PAN) was prepared by solution casting from a dimethylformamide (DMF) solution. The polymer was air-dried at ambient or room temperature (about 25° C.) to minimize condensation of the PAN. Tungsten wire leads were then attached to the film with conductive graphite paint. Two probe resistance measurements were taken through the wire leads using a Keithley 616 digital electrometer. The conductivity ($\sigma$) was then calculated.

$$\sigma(PAN) = 2.8 \times 10^{-13} (\Omega cm)^{-1}$$

The film was then treated with bromine vapor at a pressure corresponding to the equilibrium pressure at about 25° C. and the conductivity determined.

$$\sigma(PAN\text{-}Br_2) = 5.1 \times 10^{-13} (\Omega\text{-}cm)^{-1}$$

Thus, bromination of uncondensed PAN results in a slight increase in conductivity (about double) but still results in a material best classified as an insulator.

EXAMPLE II

Two samples of condensed polyacrylonitrile ($\Delta$PAN) were prepared (one by heating a solvent cast film, one by pressure treatment) by heating at about 200° C. for over 3 hours and the conductivity of both samples of undoped $\Delta$PAN was determined.

$$\sigma(\Delta PAN) < 10^{-10} (\Omega\text{-}cm)^{-1}$$

Thus, it appears that condensation alone accounts for an increase in conductivity of approximately three orders of magnitude. Such conductivity would place $\Delta$PAN as a marginal semiconductor.

EXAMPLE III

"Brominated" $\Delta$PAN was prepared by exposing $\Delta$PAN to bromine gas at a pressure corresponding to the equilibrium pressure at ambient temperature. Equilibrium was attained after 10 minutes. The conductivity of the resulting material was determined.

$$\sigma(\Delta PAN\text{-}Br_2) = 10^{-2} (\Omega\text{-}cm)^{-1}$$

Thermoelectric power measurements demonstrated that the $\Delta$PAN-Br$_2$ was a p-type semiconductor. Bromination of additional samples demonstrated that the electrical conductivity of $\Delta$PAN-Br$_2$ can be varied over 8 orders of magnitude by variation of the Br$_2$ vapor pressure.

EXAMPLE IV

"Iodinated" $\Delta$PAN was prepared by exposing $\Delta$PAN to the equilibrium vapor pressure of iodine at ambient. After 30 minutes, equilibrium was reached and the conductivity determined.

$$\sigma(\Delta PAN\text{-}I_2) = 10^{-3} (\Omega\text{-}cm)^{-1}$$

Thermoelectric power measurements demonstrated that the $\Delta$PAN-I$_2$ was a p-type semiconductor.

EXAMPLE V

A $\Delta$PAN sample was placed in a solution of sodium, naphthalene and tetrahydrofuran for 16 hours with no evidence of an increase in conductivity. A $\Delta$PAN-Br$_2$ sample was then prepared as in Example III. When Br vapor was pumped away, the conductivity of the sample reverted to less than $10^{-10}$ ($\Omega$-cm)$^{-1}$. The sample was then placed in a solution of sodium, naphthalene and tetrahydrofuran for 30 minutes and the conductivity of the resulting $\Delta$PAN-Na polymer was determined.

$$\sigma(\Delta PAN\text{-}Na) = 10^{-3} (\Omega\text{-}cm)^{-1}$$

Thermoelectric power measurements demonstrated that the $\Delta$PAN-Na was an n-type semiconductor.

EXAMPLE VI $\Delta$PAN-Br$_2$ was prepared as in Example III. A device comprising a layer of $\Delta$PAN-Br$_2$ sandwiched between aluminum and gold electrodes showed diode characteristics which would be characteristic of a Schottky-type barrier between the aluminum and the $\Delta$PAN-Br$_2$.

EXAMPLE VII

In a nitrogen atmosphere, films of PMAN prepared by both methods described above were cast from DMF solution, dried at ambient temperature, and thermally degraded at about 190° C. for 24 hours. The resulting $\Delta$PMAN films were translucent, deep red, and rather brittle. Above 220° C., depolymerization of PMAN to the monomer occurs. Deep red films of $\Delta$PMAN can also be prepared by heating the yellow PMAN powder at 190° C. under pressure for 30 minutes. The films of AIBN- and BuLi-initiated $\Delta$PMAN were exposed to the equilibrium vapor pressure of I$_2$ for 1-5 days at ambient and elevated temperatures and in ambient and dry nitrogen atmospheres. The various conditions for the $\Delta$PMAN iodinations, together with the respective electrical conductivities exhibited by the samples initially after iodination, are summarized in Table 1.

TABLE 1

| Polymer Initiator | Length of Iodination (days) | Temp. of Iodination (°C.) | Atmosphere During Iodination | Conductivity $\sigma(\Omega\text{-}cm)^{-1}$ |
|---|---|---|---|---|
| AIBN | (untreated $\Delta$PMAN) | | | $10^{-12}$ |
| AIBN | 1 | ambient | ambient | $10^{-10}$ |
| AIBN | 1 | 90° C. | ambient | $2 \times 10^{-4}$ |
| AIBN | 1 | 110° C. | dry N$_2$ | $1 \times 10^{-5}$ |
| AIBN | 2 | 110° C. | ambient | $2 \times 10^{-7}$ |
| AIBN | 1 | 110° C. | dry N$_2$ | $2 \times 10^{-6}$ |
| AIBN | 2 | 110° C. | dry N$_2$ | $5 \times 10^{-6}$ |
| AIBN | 3 | 110° C. | dry N$_2$ | $2 \times 10^{-6}$ |
| AIBN | 4 | 110° C. | dry N$_2$ | $2 \times 10^{-6}$ |
| AIBN | 5 | 110° C. | dry N$_2$ | $1 \times 10^{-4}$ |
| BuLi | 1 | 110° C. | dry N$_2$ | $2 \times 10^{-5}$ |

TABLE 1-continued

| Polymer Initiator | Length of Iodination (days) | Temp. of Iodination (°C.) | Atmosphere During Iodination | Conductivity $\sigma(\Omega\text{-cm})^{-1}$ |
|---|---|---|---|---|
| BuLi | 1 | 90° C. | dry N$_2$ | $1 \times 10^{-6}$ |

Treatment of Various ΔPMAN Samples with I$_2$ Vapor

When iodination of ΔPMAN was performed at ambient temperature, little iodine was incorporated into the films, and no color change in the films was observed. An increase of two orders of magnitude in electrical conductivity from $10^{-12}$ to $10^{-10}$ $(\Omega\text{-cm})^{-1}$ was observed upon iodination of ΔPMAN at ambient temperature. In contrast, exposure of ΔPAN to iodine vapor at ambient (Example IV) resulted in a much greater increase in conductivity (7 orders of magnitude from $10^{-10}$ to $10^{-3}$ $(\Omega\text{-cm})^{-1}$).

Iodination of ΔPMAN at elevated temperatures (90°-110° C.) in ambient or dry nitrogen atmosphere resulted in greater conductivity increases and in greater iodine incorporation into the films relative to the samples treated at ambient temperature. These iodinated films were opaque and quite dark in color. However, a firm correlation between length of iodination and resulting conductivity is not apparent from the data. It should be noted that the highest conductivity observed for an iodinated ΔPMAN sample ($10^{-4}$ $(\Omega\text{-cm})^{-1}$) is still lower than that reported for iodinated ΔPAN. Whether the lower conductivity for iodinated ΔPAN is due to a lower degree of C-N conjugation in ΔPMAN vs. ΔPAN is not certain. Substituted acetylene polymers (such as polyphenylacetylenes) also exhibit much lower conductivities than unsubstituted polyacetylene when halogenated. Steric effects, due to substituent groups, influence the electronic structure of acetylene polymers. Similar effects may also be present in PMAN and ΔPMAN.

After treatment with I$_2$ at 110° C., ΔPMAN films were found to be unstable with respect to halogen loss and electrical conductivity when maintained in an iodine-deficient atmosphere—even at ambient temperature. The opaque, deeply colored films eventually became translucent and red over a period of 1-2 weeks. The electrical conductivities of such films decreased throughout this time period. Hence, the iodine stability in ΔPMAN is not greater than that in ΔPAN.

EXAMPLE VIII

ΔPMAN films prepared as in Example VII were exposed to the equilibrium vapor pressure of Br$_2$ at ambient. The ΔPMAN films began to decompose, became lighter in color and somewhat pliable with no observed increase in conductivity.

EXAMPLE IX

A crystal of n-type cadmium sulfide coated on one face with PMAN was thermally degraded and then iodinated. The formation of a typical p-n rectifying junction between ΔPMAN-I$_2$ and the n-CdS crystal was verified when the current and voltage behavior of the combination were observed to exhibit diode-like characteristics.

It is significant to note that the conductivities of ΔPAN-Br$_2$ (Example III) and ΔPMAN-I$_2$ (Example VII) are neither predictable nor expected from the combined effects of condensation and bromination. In particular, bromination alone appears to account for only a doubling in the conductivity of PAN (Example I). Condensation alone results in ΔPAN having a conductivity about three orders of magnitude greater than PAN (Example II). Condensation followed by bromination results in an increase in conductivity of about $10^{11}$ relative to PAN. Thus, successive condensation and bromination increases the conductivity of PAN by about $10^8$ more than would be expected from their individual effects. Analogous observations also apply to ΔPMAN-I$_2$.

EXAMPLE X

Polyalphachloroacrylonitrile (PACN) was made by polymerizing alphachloroacrylonitrile monomer using AIBN as an initiator. A colorless film of PACN was cast from DMF solution and dried at room temperature under nitrogen. ΔPACN was made by heating the film to effect dehydrochloronation. After 3 days of heating approximately 70% of theoretical HCl was lost from the ΔPACN film and the film became a deep, glossy purple color. The conductivity of undoped ΔPACN was determined $$\sigma(\Delta PACN) = 10^{-12}(\Omega\text{-cm})^{-1}$$

The ΔPACN film was exposed to the equilibrium vapor pressure of Br$_2$ at ambient and the conductivity determined.

$$\sigma(\Delta PACN\text{-Br}_2) = 10^{-6}(\Omega\text{-cm})^{-1}$$

The conductivity was observed to decrease if the sample was not maintained in a bromine saturated atmosphere.

EXAMPLE XI

A film of ΔPACN prepared as in Example X was exposed to the equilibrium vapor pressure of I$_2$ at ambient and the conductivity determined.

$$\sigma(\Delta PACN\text{-I}_2) = 10^{-12}(\Omega\text{-cm})^{-1}$$

The same film was maintained in an iodine atmosphere for 2 days at ambient with no change in conductivity and no evidence of iodine uptake.

The ΔPACN was then exposed to the equilibrium vapor pressure of I$_2$ at 100° C. for two days with no change in conductivity or evidence of iodine uptake. The reason for the failure to dope ΔPACN with iodine is not yet understood.

We claim:

1. The composition prepared by the process which comprises contacting a modified polymer selected from the group consisting of condensed polyacrylonitrile, condensed substituted polyacrylonitrile, and dehydrohalogenated polyalphahaloacrylonitrile with at least one doping reagent capable of forming a charge-transfer complex with said polymer, wherein the doping reagent is selected from the group consisting of electron-acceptors and electron-donors and the amount of said doping reagent is effective to increase the electrical conductivity of said polymer.

2. The composition as set forth in claim 1 wherein said doping reagent is selected from the group consisting of bromine, iodine, chlorine, IBr, ICl, AsF$_5$, HBr, BF$_3$, BCl$_3$, SO$_2$, SO$_3$, transition metal complexes, Na, K, Ba, Li, Ca, Mg and Al.

3. The composition as set forth in claim 1 wherein said modified polymer is selected from the group consisting of condensed polyacrylonitrile, condensed polymethacrylonitrile, and dehydrohalogenated polyalphahaloacrylonitrile.

4. The composition as set forth in claim 3 wherein said modified polymer is dehydrochlorinated polyalphachloroacrylonitrile.

5. The composition as set forth in claim 3 wherein said doping reagent is selected from the group consisting of bromine, iodine and sodium naphthalide.

6. The composition as set forth in claim 3 wherein said doping reagent is selected from the group consisting of bromine and iodine.

7. The composition prepared by the process which comprises contacting a condensed polyacrylonitrile with a doping reagent selected from the group consisting of bromine and iodine wherein the amount of said doping reagent is effective to increase the electrical conductivity of said condensed polyacrylonitrile.

8. A process for enhancing the electrical conductivity of an organic polymer which comprises contacting a modified polymer selected from the group consisting of condensed polyacrylonitrile, condensed substituted polyacrylonitrile, and dehydrohalogenated polyalphahaloacrylonitrile with at least one doping reagent capable of forming a charge-transfer complex with said polymer, wherein the doping reagent is selected from the group consisting of electron-acceptors and electron-donors and the amount of said doping reagent is effective to increase the electrical conductivity of said polymer.

9. The process as set forth in claim 8 wherein said doping reagent is selected from the group consisting of bromine, iodine, chlorine, IBr, ICl, $AsF_5$, HBr, $BF_3$, $BCl_3$, $SO_2$, $SO_3$, transition metal complexes, Na, K, Ba, Li, Ca, Mg and Al.

10. The process as set forth in claim 8 wherein said modified polymer is selected from the group consisting of condensed polyacrylonitrile, condensed polymethacrylonitrile, and dehydrohalogenated polyalphahaloacrylonitrile.

11. The process as set forth in claim 10 wherein said modified polymer is dehydrochlorinated polyalphachloroacrylonitrile.

12. The process as set forth in claim 10 wherein said doping reagent is selected from the group consisting of bromine, iodine and sodium naphthalide.

13. The process as set forth in claim 10 wherein said doping reagent is selected from the group consisting of bromine and iodine.

* * * * *